No. 826,079. PATENTED JULY 17, 1906.
A. AIKELE, Jr.
PLANTER.
APPLICATION FILED JUNE 16, 1905.
2 SHEETS—SHEET 1.
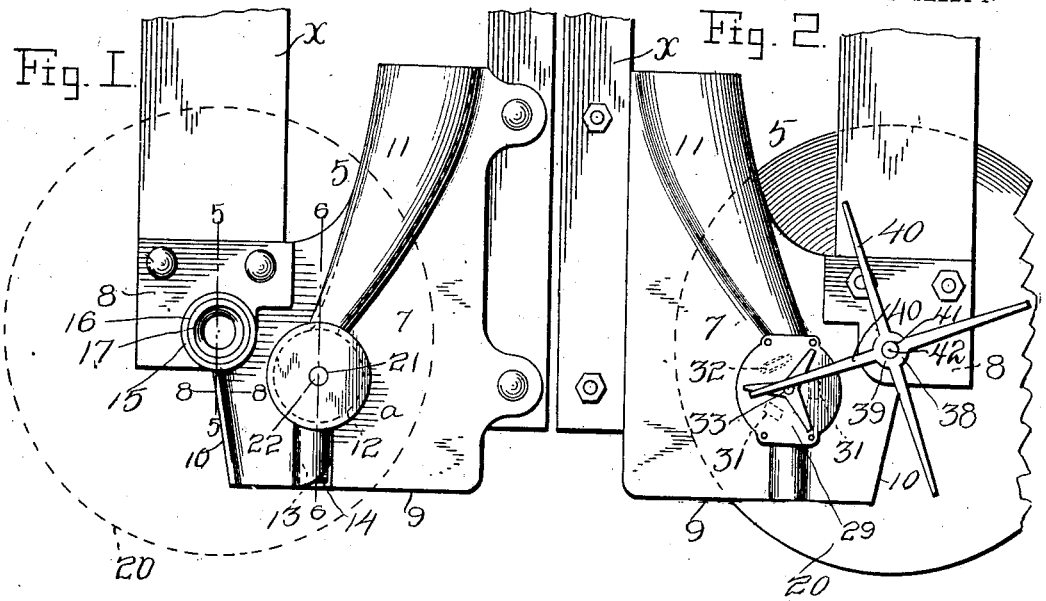
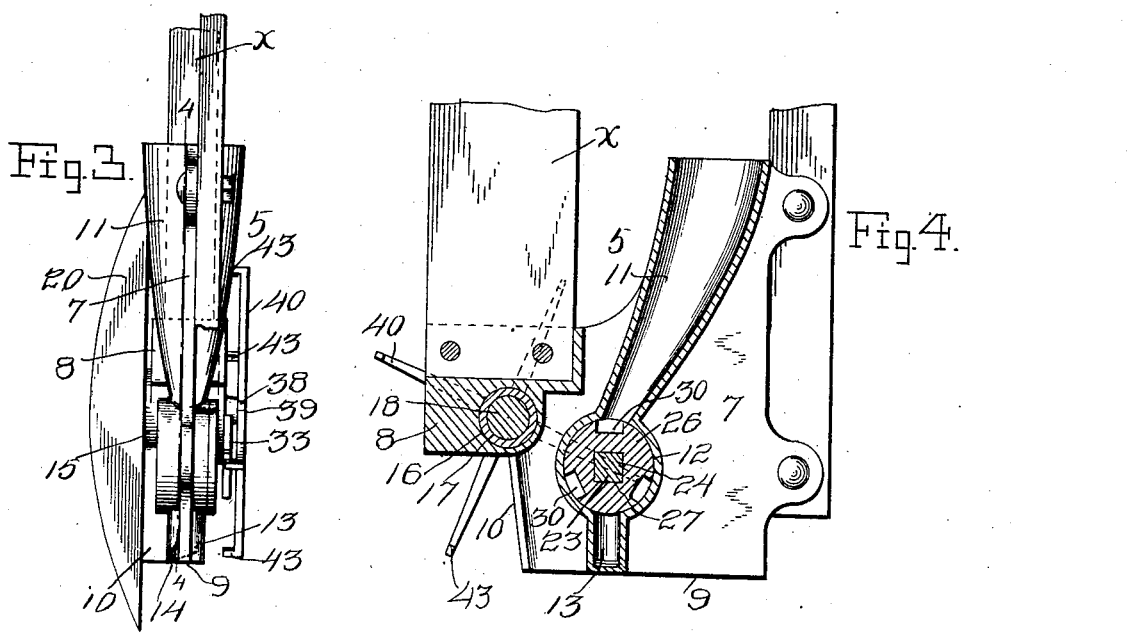

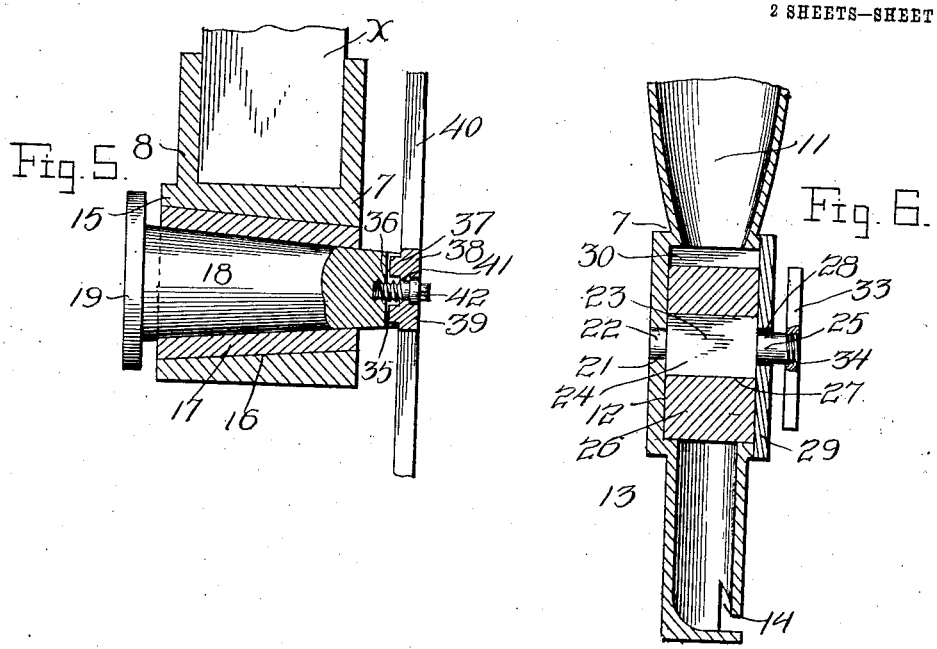
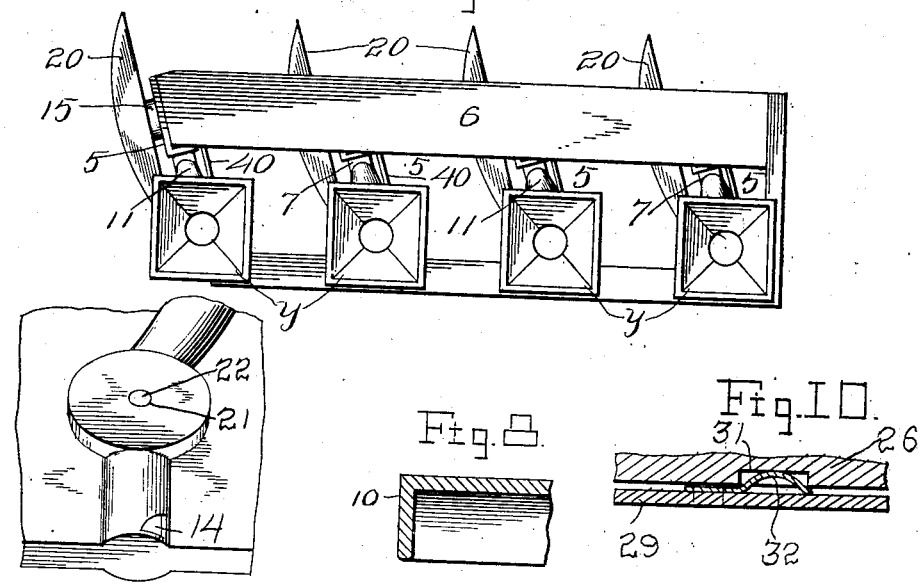

UNITED STATES PATENT OFFICE.

ANDREAS AIKELE, JR., OF PROVIDENCE, UTAH.

PLANTER.

No. 826,079.   Specification of Letters Patent.   Patented July 17, 1906.

Application filed June 16, 1905. Serial No. 265,566.

*To all whom it may concern:*

Be it known that I, ANDREAS AIKELE, Jr., a citizen of the United States, residing at Providence, in the county of Cache, State of Utah, have invented certain new and useful Improvements in Planters; and I do hereby declare the following to be a full, clear, and exact description of the invention, such as will enable others skilled in the art to which it appertains to make and use the same.

This invention relates to farm implements, and more particularly to planters, and has for its object to provide a planter including revoluble ground-treating disks and a seed-discharging mechanism, the latter being arranged for operation by the former, another object being to provide a novel arrangement of parts which will not be likely to become deranged.

Other objects and advantages will be apparent from the following description, and it will be understood that changes in the specific construction shown and described may be made within the scope of the claims and that any suitable materials may be used without departing from the spirit of the invention.

In the drawings forming a portion of this specification, and in which like characters of reference indicate similar parts in the several views, Figure 1 is a side elevation of one of the individual mechanisms of the present planter, illustrating the supporting-frame and showing the adjacent disk in dotted lines. Fig. 2 is a view of the opposite side of Fig. 1, the disk being shown in full lines. Fig. 3 is a rear elevation. Fig. 4 is a longitudinal section on line 4 4 of Fig. 3. Fig. 5 is a section on line 5 5 of Fig. 1. Fig. 6 is a detail section of a portion of the casting and the feeding-disk, taken on line 6 6 of Fig. 1. Fig. 7 is a top plan view of the seedboxes of a planter provided with the present invention. Fig. 8 is a detail section of a portion of the casing, showing the portion 10 taken on line 8 8 of Fig. 1. Fig 9 is a perspective view of a portion of a casing, showing the discharge-opening. Fig. 10 is a detail sectional view showing the spring-detent.

Referring now to the drawings, there is shown in Fig. 7 a planter including a plurality of individual ground-treating and seed-discharging mechanisms 5, which are connected to a common frame 6. The several mechanisms are identical, so that a description of one will suffice for all.

Each of the mechanisms comprises a casting 7, having a forwardly-extending portion 8, which terminates short of the lower edge 9 of the remainder of the casting, so that there is a short forward edge portion 10, beyond which the portion 8 projects. Formed in the main portion *a* of the casting there is a downwardly and forwardly extending seed-chute 11, which terminates in a circular recess 12, which extends vertically, and formed in the portion *a* of the casting below the recess there is a short discharge-passage 13. The recess opens through one face of the casting, and the passage 13 opens at its lower rearward corner through the opposite face of the casting, as shown at 14. The lower end of the chute is closed, so that the seed falls from the opening 14, the closure being slanted to give the seed a lateral movement toward the opening.

Formed upon the lower rearward portion of the portion 8 of the casting there is a boss 15, which lies above the edge portion 10, and this boss extends beyond the face of the casting through which the passage 13 opens and opposite to that through which the recess 12 opens. A horizontal passage 16 is formed through the boss and through the casting, and secured within the boss there is a boxing 17, which receives a spindle 18, having a circular plate 19 at one end, which is secured to a ground-treating disk 20, concentrically thereof, the ground-treating disk lying at that side of the casting from which the boss 15 projects, and the edge portion 10 of the casting is curved in the direction of the disk beneath the boss 15 to lie in close relation to the disk, thus preventing the passage of earth between the disk and the casting. The spindle 18 projects beyond the opposite face of the casting from the disk for a purpose to be presently described.

Formed in the casting there is a perforation 21, lying concentrically with the recess 12, and this perforation receives the rounded end 22 of a square axle 23, including a central portion 24 and an opposite rounded end portion 25, the latter being threaded. A seed-treating disk 26 lies within the recess 12 and has a central squared opening 27, which receives the central portion 24 of the axle 23, the rounded end 25 of the axle being received in a central perforation 28 in a cap 29, which is secured over the open side of the recess.

The seed-treating disk 26 has a plurality of peripheral notches 30, which form seed-receiving pockets and which are arranged for interchangeable registration with the lower end of the seed-chute 11 to receive seed therefrom. Formed in the surface of the disk 26 which lies adjacent to the cap 29 there are a plurality of depressions 31, arranged in a circular series, which are disposed for the successive reception of a spring-detent 32, mounted in the cap, this detent being disposed to hold the disk yieldably against movement and with its pockets in registration with the seed-chute.

A spider-plate 33, including a central portion and a plurality of radiating-arms, is provided with a central threaded perforation 34, which is screwed upon the end 25 of the axis 23, so that when this spider-plate is revolved the seed-feeding disk 26 will be revolved to successively position its pockets beneath the chute 11. It will of course be seen that as the disk moves its pockets will be first positioned beneath the seed-chute, as mentioned, and will afterward be registered with the discharge-passage 13 to discharge the seed therethrough, and by reason of the opening 14 of this passage the seed will be thrown against the disk and will pass to the furrow opened by the latter.

The end of the spindle opposite to that which carries the circular plate 19 is transversely slotted, as shown at 35, and this end of the spindle is also provided with a central pin-receiving opening 36, which is in reality a lateral enlargement of the slot 35. The slot 35 receives lugs 37, carried by the central portion 38 of a second spider-plate 39, having a plurality of radial arms 40, and this spider-plate has a central opening 41, which receives a retaining-pin 42, engaged in the opening 36. The arms 40 pass over the spider-plate 33 as the spider-plate 39 is revolved, and the outer extremities of the arms 40 are turned inwardly, so that they engage the arms of the plate 33 to turn the latter, the inwardly-turned portions being indicated at 43. It will be understood that variations in the arrangement and number of the arms of the spider-plate will vary the rapidity with which the disk 26 is revolved with resultant variation of the amount of seed discharged in a given distance. The spider-plates are detachable and different spider-plates may thus be placed in position having different numbers of arms to suit different conditions.

As shown, each of the castings 7 is supported by suitable devices x, which are connected with the frame 6. The seed-chutes 11 are connected at their upper ends with a seedbox y.

What is claimed is—

1. A ground-treating and seed-discharging mechanism for planters comprising a casting having a seed-chute therein and having a discharge-passage, operative means for transferring seed from the seed-chute to the discharge-passage, a ground-treating disk revolubly mounted upon the casting, an operating device connected with the said transferring means and a tripper connected with the disk for rotation therewith and adapted for engagement of the operating device intermittently to actuate said device.

2. A seed-distributing mechanism for planters comprising a seed-chute, a pocketed disk disposed below the seed-chute for rotation to successively position its pockets to receive seed from the chute and to discharge such seed, a spider-plate carried by the disk, a bearing located adjacent to the disk, a spindle revolubly mounted in the bearing said spindle having a transversely-slotted end, a spider-plate having lugs engaged in the slot for rotation of the spider-plate with the spindle, and a ground-engaging device carried by the spindle for rotation thereof said second-named spider-plate being disposed for engagement of the first-named spider-plate when it is revolved to rotate said first-named spider-plate and the pocketed disk.

3. A ground-treating and seed-distributing mechanism for planters comprising a casting having a seed-chute therein and a circular recess with which the lower end of the seed-chute communicates, said casting having a discharge-passage therein communicating with the lower portion of the recess, a disk revolubly mounted in the recess and having a pocket in its periphery said disk being arranged to register its pocket with the seed-chute and the discharge-passage successively to receive seed therefrom and to discharge seed therethrough respectively, a cap for the recess, an arm connected with the pocketed disk and lying exteriorly of the cap for rotation of the disk, a ground-treating disk rotatably mounted upon the casting, and an arm connected with the ground-treating disk and adapted for engagement of the first-named arm to rotate the pocketed disk when the ground-treating disk is revolved.

In testimony whereof I affix my signature in presence of two witnesses.

ANDREAS AIKELE, Jr.

Witnesses:
DANIEL WETTSTEIN, Sr.,
DANIEL WETTSTEIN, Jr.